United States Patent
Trautenberg

(10) Patent No.: US 9,052,377 B2
(45) Date of Patent: Jun. 9, 2015

(54) SATELLITE-BASED SAR SERVICES

(75) Inventor: Hans L. Trautenberg, Cologne (DE)

(73) Assignee: Astrium GmbH, Taufkirchen (DE)

( * ) Notice: Subject to any disclaimer, the term of this patent is extended or adjusted under 35 U.S.C. 154(b) by 374 days.

(21) Appl. No.: 13/574,414

(22) PCT Filed: Jan. 21, 2011

(86) PCT No.: PCT/DE2011/000061
§ 371 (c)(1),
(2), (4) Date: Oct. 8, 2012

(87) PCT Pub. No.: WO2011/088824
PCT Pub. Date: Jul. 28, 2011

(65) Prior Publication Data
US 2013/0023205 A1    Jan. 24, 2013

(30) Foreign Application Priority Data

Jan. 22, 2010    (DE) .................. 10 2010 005 582

(51) Int. Cl.
*H04W 4/22*    (2009.01)
*G01S 5/02*    (2010.01)
*G01S 19/17*    (2010.01)

(52) U.S. Cl.
CPC .............. *G01S 5/0231* (2013.01); *G01S 19/17* (2013.01)

(58) Field of Classification Search
CPC ......... G01S 19/17; G01S 19/00; G01S 19/01; G01S 19/15; G01S 19/18; G01S 19/20; G01S 29/24; G01S 19/243; G01S 19/25; G01S 19/254; G01S 19/26; G01S 19/31; G01S 19/32; G01S 19/33; G01S 5/02
USPC ............. 455/12.1, 427, 430, 426, 428, 404.2, 455/404.1; 370/316, 370, 338; 356/4.01; 342/357.09, 357.07, 25; 340/573.4, 340/686.1, 990, 425.5, 438, 902, 945; 380/258; 701/4

See application file for complete search history.

(56) References Cited

U.S. PATENT DOCUMENTS

| 5,552,772 | A | | 9/1996 | Janky et al. |
| 5,969,673 | A | * | 10/1999 | Bickley et al. ........... 342/357.59 |

(Continued)

FOREIGN PATENT DOCUMENTS

| GB | 2 430 062 A | 3/2007 |
| GB | 2 452 386 A | 3/2009 |

(Continued)

OTHER PUBLICATIONS

Corresponding International Search Report with English Translation dated May 25, 2011 (six (6) pages).

(Continued)

*Primary Examiner* — Tan Trinh
(74) *Attorney, Agent, or Firm* — Crowell & Moring LLP

(57) ABSTRACT

A satellite-based SAR system having a space segment with a plurality of satellites and a ground segment with one or a plurality of ground stations is provided. A satellite receives a position report from an emergency transmitter in its service area and forwards it to a ground station. The ground segment stores the position of the emergency transmitter, received with the last position report, in a management system for emergency transmitters. The emergency transmitter sends position reports to the satellite such that the reception of position reports at the satellite is coordinated such that at any time only position reports arrive which differ with regard to their signal parameters such that simultaneous reception is possible. A rescue operation is initiated for the emergency transmitter if no deactivation message has been received from the emergency transmitter and no position report is received from the emergency transmitter within a specified period.

15 Claims, 2 Drawing Sheets

(56) References Cited

U.S. PATENT DOCUMENTS

Figure 1:
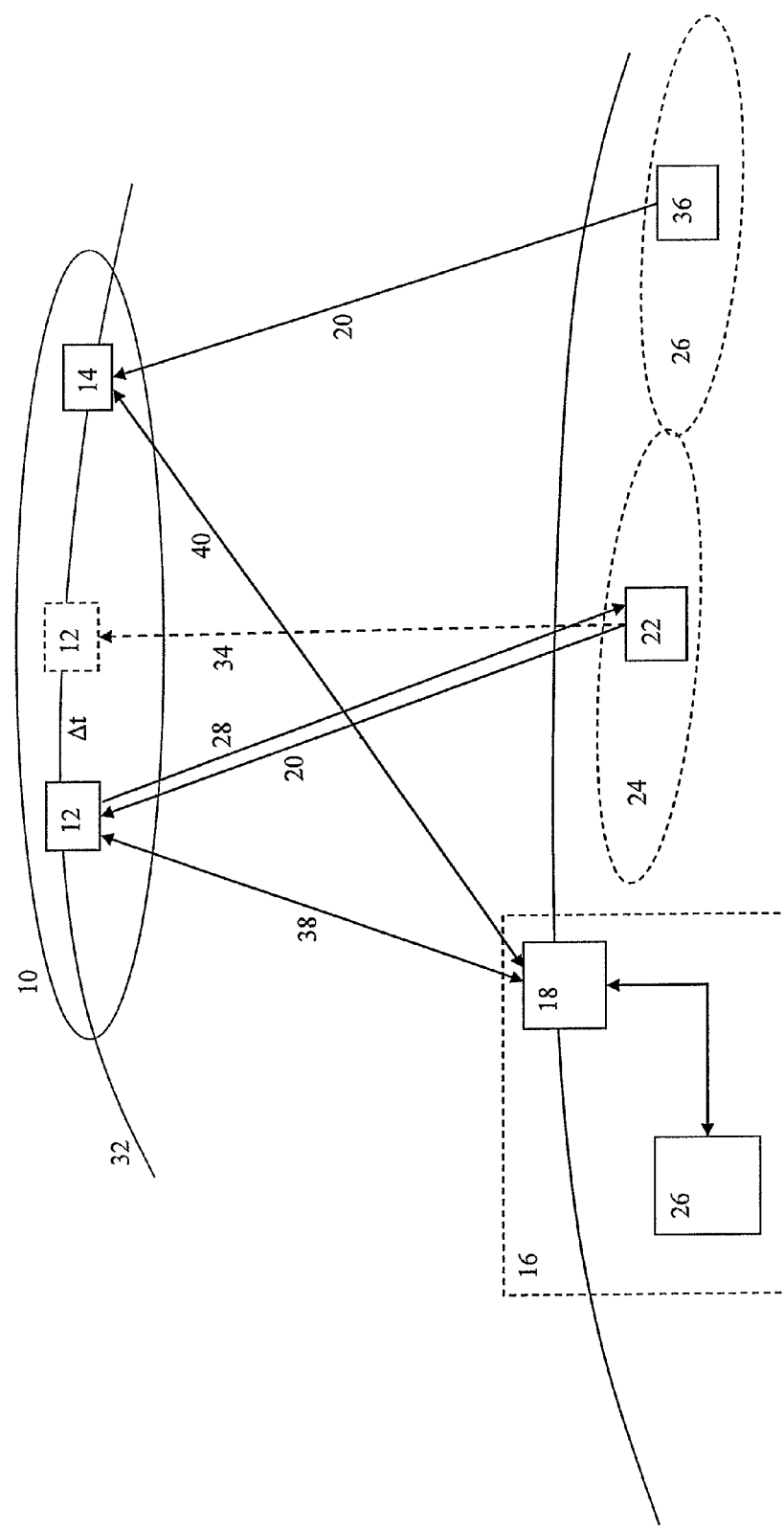

| | | | |
|---|---|---|---|
| 6,208,859 B1* | 3/2001 | Halvorson | 455/430 |
| 6,992,991 B2* | 1/2006 | Duske et al. | 370/316 |
| 2003/0130771 A1* | 7/2003 | Crank | 701/4 |
| 2004/0190720 A1* | 9/2004 | Harvey | 380/258 |
| 2005/0287980 A1* | 12/2005 | Wood | 455/404.1 |
| 2007/0008174 A1* | 1/2007 | Schwartz | 340/902 |
| 2008/0084551 A1* | 4/2008 | Harnisch | 356/4.01 |
| 2009/0051510 A1* | 2/2009 | Follmer et al. | 340/425.5 |
| 2009/0140887 A1* | 6/2009 | Breed et al. | 340/990 |
| 2009/0167536 A1* | 7/2009 | Clark et al. | 340/573.4 |
| 2009/0233573 A1* | 9/2009 | Gray | 455/404.2 |
| 2010/0207845 A1* | 8/2010 | Pal et al. | 345/7 |

FOREIGN PATENT DOCUMENTS

| | | |
|---|---|---|
| GB | 2 470 376 A | 11/2010 |
| WO | WO 01/78032 A1 | 10/2001 |

OTHER PUBLICATIONS

Form PCT/ISA/237 (seven (7) pages).

* cited by examiner

SATELLITE-BASED SAR SERVICES

BACKGROUND AND SUMMARY OF THE INVENTION

Exemplary embodiments of the present invention relate to a satellite-based SAR system and an emergency transmitter for such a SAR system.

A typical satellite-based system for supporting search and rescue services SAR (Search and Rescue) is the COSPAS/SARSAT system, which offers Doppler-based locating and also emergency radio. In the COSPAS/SARSAT system, emergency signals that are transmitted by emergency transmitters on the international emergency frequencies 121.5 MHz, 243 MHz, and 406 MHz are relayed via special transponders on board satellites to ground stations LUT (Local User Terminal), and the received emergency signals and the data contained therein are transferred to a control center MCC (Mission Control Center), which determines rescue measures that are then executed by a rescue coordination center (RCC). LEO (Low Earth Orbit) satellites and GEO (Geostationary Earth Orbit) satellites are used as carriers for the transponders. In order to be able to ensure an even better reception of emergency calls it is also planned to include satellites of the future European satellite navigation system Galileo in the COSPAS/SARSAT system.

In its newest version, an emergency transmitter also transfers position data, determined through NAVSTAR-GPS, of a transmitter in an emergency situation, for example of an aircraft, ship or a person, to the ground station LUT of the COSPAS/SARSAT system. In this manner, localization of the transmitter in distress can be improved with respect to the locating carried out based on conventional Doppler locating. However, this requires that the emergency transmitter still functions after triggering an emergency call and that a connection to the satellite of the COSPAS/SARSAT system can be established, which, for example, is in most cases not possible after crashes of small aircrafts because very often, these aircrafts lie in such a problematic terrain that the satellites can no longer be contacted.

This shortcoming is partially overcome by the so-called SPOT (Satellite Personal Tracker) messenger recently launched by the Canadian enterprise SPOT Inc. In a special operating mode, an activated SPOT messenger transmits its position data, determined by means of NAVSTAR-GPS, approximately every 10 minutes to a database application that makes this position accessible for authorized users through a web interface. However, the period of approximately 10 minutes between the transfers of the position of the SPOT satellite messenger and the low reliability of the individual transfers can result in the actual time intervals between the positions known in the database application becoming very long, and therefore also the search area in an emergency case becomes very large. Up to now, a search is triggered when the user pushes the emergency button on the SPOT emergency unit or, if the aircraft is overdue, an authorized user of the database application transmits the latest position stored in the database application to the search and rescue service. In many cases, the emergency transmitter becomes inoperable during the crash so that this second way would be frequently needed. However, this can only take place if an authorized person considers the aircraft as being overdue, which is often the case only several hours after the accident.

Exemplary embodiments of the present invention provide improved satellite-based SAR services that provide a smaller search area in an emergency.

In accordance with the present invention an emergency transmitter reports its position to a satellite at a specified time calculated depending on the orbit and the position of the satellite and the emergency transmitter's own position, and if no position reports from an emergency transmitter are received within a specified time after receipt of the last position report, the SAR system initiates a rescue action if the emergency transmitter is not logged out of the system. In this manner the search area in an emergency case can be limited to a relatively small area while alerting still works when the emergency transmitter has been destroyed, so that safety can be significantly improved with the SAR system according to the invention.

According to one embodiment, the invention relates to a satellite-based SAR system having a space segment with a plurality of satellites and a ground segment with one or a plurality of ground stations, wherein a satellite receives a position report from an emergency transmitter in its service area and forwards it to a ground station, and stores in each case the last reported position and time of the emergency transmitter until the satellite can forward the position to a ground station, the ground station stores the emergency transmitter's position, received with the last position report, in a management system for emergency transmitters, the emergency transmitter sends position reports to satellites such that the reception of position reports at the satellite are coordinated in such a manner that at any time only position reports are received that differ with regard to their signal parameters such that simultaneous reception is possible, and a rescue operation is initiated for the emergency transmitter if no deactivation message has been received from the emergency transmitter and no position report is received from the emergency transmitter within a specified period.

Furthermore, a data message with the expected time at which the next position report from the emergency transmitter is to be received at a satellite can be transmitted to the emergency transmitter, and/or a data message with at least one parameter for an algorithm, according to which the individual emergency transmitters can calculate the planned reception times of their messages at the satellite and the signal parameters used for this purpose, can be transmitted simultaneously to a multiplicity of emergency transmitters in the service area, and the emergency transmitter can determine the position of the satellite based on the information contained in the received data message and, with the position of the satellite and its own position, can calculate when the next position report is to be sent to the satellite such that the position report is received by the satellite at the expected time.

After receiving the position report from the emergency transmitter, the data message can be transmitted by the satellite or also via a different medium. The emergency transmitter can determine the orbit of a satellite based on Doppler measurements of signals of the satellite and use the orbit for determining the position of the satellite. Alternatively, it is also possible to transmit the orbit together with the data message to the emergency transmitter so that the emergency transmitter itself does not have to determine the orbit.

For the purpose of deactivation, the emergency transmitter can send a deactivation message to the space segment, and after receiving the deactivation message, the logout of the emergency transmitter from the management system can be initiated, and after logging out, a logout message can be transmitted via the space segment to the emergency transmitter which deactivates upon receiving this message.

Furthermore, a data message may contain a specified coding with which the next position report from the emergency transmitter is to be received, wherein the specified coding comprises in particular a specified frequency, a specified modulation and/or a specified message content.

The expected time contained in a data message can be determined such that at the expected time, the satellite sending the data message is still within the reception range of the emergency transmitter.

The time difference between time of sending a data message and the expected time contained in the data message can be at most approximately 5 minutes, in particular less than 5 minutes.

Initiating a rescue operation for an emergency transmitter can comprise transmitting a rescue message from the management system to a rescue coordination center in the vicinity of the emergency transmitter's last position stored in the management system.

In another embodiment, the invention relates to an emergency transmitter for a satellite-based SAR system according to the invention and as described above, comprising a transceiver for sending and receiving messages to and from, respectively, satellites of the space segment of the SAR system, a position determining unit for determining the actual position of the emergency transmitter, and a control unit for generating and sending position reports via the transceiver, and receiving and processing data messages at and from, respectively, satellites of the space segment of the SAR system.

The position determining unit can comprise a receiver for navigation signals of a satellite navigation system and a processor for calculating the actual position from the received navigation signals.

The control unit can be configured such that it determines, based on the information contained in a received data message, the position of a satellite that sent the data message, and calculates, using the position of the satellite and the actual position of the emergency transmitter, when the next position report is to be sent to the satellite, and sends at the calculated time the next position report with the now actual position of the emergency transmitter via the transceiver to the satellite.

Furthermore, the control unit can be configured such that based on the specified coding, which is contained in the received data and with which the next position report from the emergency transmitter is to be received, the control unit controls how the next position report is sent to a satellite, wherein the specified coding comprises a specified frequency, a specified modulation and/or a specified message content, and the control unit controls, according to the specification, the frequency, the modulation or the message content of the next position report to be sent.

Further advantages and possibilities of use of the present invention arise from the following description in connection with the exemplary embodiments illustrated in the drawings.

In the description, the claims, the abstract, and the drawings, the terms and associated reference numbers used in the reference list set out at the end are used.

BRIEF DESCRIPTION OF THE DRAWING FIGURES

Figure 2:
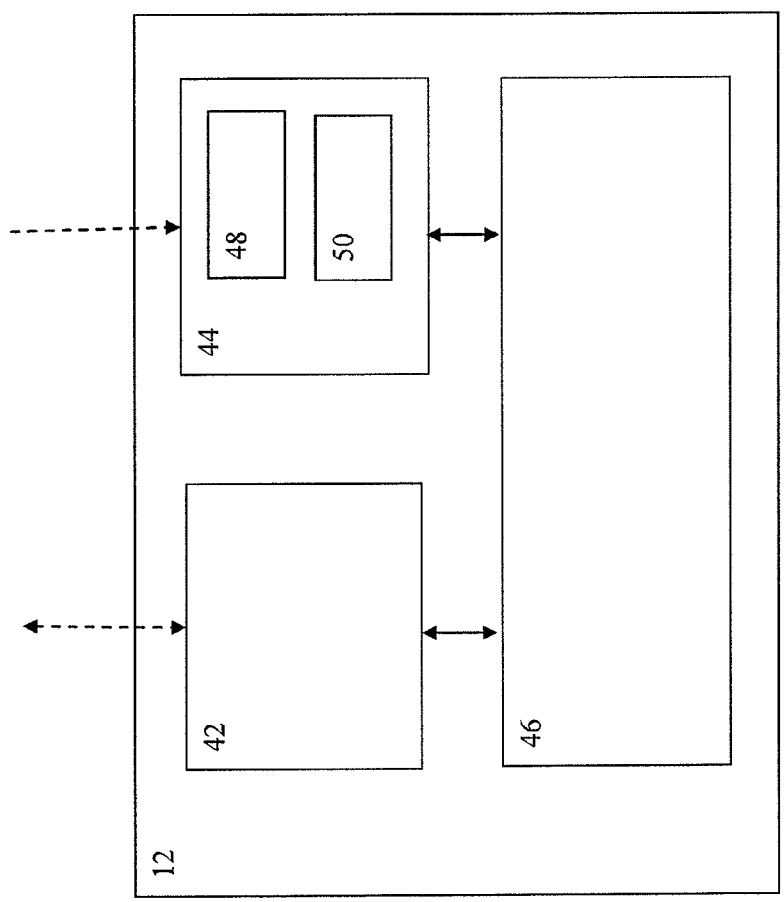

In the figures:

FIG. 1 shows an exemplary embodiment of a satellite-based SAR system according to the invention, and FIG. 2 shows a block diagram of an exemplary embodiment of an emergency transmitter according to the invention.

DETAILED DESCRIPTION

In the following description, identical, functionally identical and functionally connected elements may be indicated with the same reference numbers. Absolute values are given only exemplary hereafter and are not to be understood as limiting the invention.

FIG. 1 illustrates a configuration of a satellite-based SAR system having a space segment 10 and a ground segment 16. The space segment includes a plurality of satellites (of which a first satellite 12 and a second satellite 14 are illustrated), which orbit the earth in an orbit 32, for example a LEO. Each of the two satellites 12 and 14 has a separate service area 24 and 26, respectively, which is defined by the footprint of the respective satellite. Within the service area, the respective satellite can receive radio signals from emergency transmitters. Moreover, radio signals sent by the satellite can be received within its service area. The service areas of satellites can overlap.

Each satellite 12 and 14 has one transponder that forwards signals or reports from emergency transmitters to the ground segment 16 of the SAR system, and forwards signals or reports or messages from the ground segment 16 to emergency transmitters. Thus, by using the transponder, each satellite 12 and 14 can not only bi-directionally communicate with the emergency transmitters 22 and 36, respectively, but can also establish a bi-directional communication connection 38 and 40, respectively, with a ground station 18 of the ground segment 16. Moreover, each satellite can store position reports received from emergency transmitters until the satellite is in contact again with the ground station, and to subsequently transmit the stored position reports to the ground station.

Usually, the ground segment has a plurality of ground stations distributed over a certain area. The ground stations are connected in a communicating manner with a management system 26 for emergency transmitters. The management system 26 manages all emergency transmitters logged into the SAR system. Logging in means that an emergency transmitter is registered in the SAR system and is tracked. If an emergency transmitter can no longer be tracked, i.e., no more position reports of the emergency transmitter are received by the SAR system, a rescue operation for the emergency transmitter is automatically initiated in that the management system 26 automatically generates a corresponding message with the last stored position of the emergency transmitter, the time of reception of the last position report from the emergency transmitter, and the identification of the latter and transmits it to a rescue coordination center (RCC), which subsequently can initiate a rescue operation in the area of the last stored position of the emergency transmitter.

According to the present invention, an emergency call does not have to be actively triggered by an emergency transmitter; instead, under certain circumstances, a rescue operation is automatically initiated by the SAR system, as explained hereafter. It is expected that an emergency transmitter 22 logged in to the SAR system periodically sends position reports 20 to the satellite 12 in the service area 24 of which the emergency transmitter is located. Here, the emergency transmitters are configured such that they send their signals or position reports or messages in such a manner that the reception at a satellite is coordinated such that at any time only signals arrive that differ with regard to their signal parameters such that a simultaneous reception is possible. In particular, the times of reception of position reports at the satellite 12 are determined by the orbit 32. Furthermore, further parameters for the position reports, such as the coding of a position report, for example, a specified frequency for transmitting the position report, a specified modulation, and/or a specified message content can be specified by the SAR system. If the messages no longer arrive at the satellite 12, but at a different satellite (for example 14), of course, no rescue operation is initiated.

A position report 20 of the emergency transmitter 22 contains a unique identification of the emergency transmitter 22 and the transmitter's actual position data, which can be determined by the emergency transmitter 22 by means of a receiver for navigation signals of a satellite navigation system such as, for example, GPS, GLONASS and/or Galileo. Additionally or alternatively, the emergency transmitter 22 can also comprise an inertial navigation system (INS) by means of which the actual position can be determined even in the case of poor, disturbed, or no reception at all of navigation signals of a satellite navigation system.

The position report 20 is sent by the emergency transmitter 22 at an accurately calculated time so that the report 20 arrives at an already-mentioned specified time at the satellite 12. The time of sending is calculated from an expected time of reception of the next position report at the satellite 12 and from the orbit 32. The emergency transmitter 22 receives the expected reception time and the orbit through a data message 28 of the satellite 12, which data message is sent back by the satellite to the emergency transmitter 22 as a response to the received position report. The expected time contained in the data message 28 is primarily determined such that at the expected time, the satellite 12 sending the data message is still within the reception range of the emergency transmitter. For this purpose, the satellite can calculate and specify a suitable expected reception time based on its orbit. For example, based on the actual position of the emergency transmitter 22 and its orbit 32, the satellite can calculate at which approximate time the reception of reports from the emergency transmitter 22 is no longer possible and can specify an accordingly configured expected reception time. Moreover, when specifying the expected reception time, the time difference between the time of sending a data message and the expected time contained in the data message is at most approximately 5 minutes, in particular less than 5 minutes, so that position reports from the emergency transmitter 22 are received with a relatively high frequency, and the search radius in an emergency case is relatively small. Based on the orbit 32 received with the data message 28 from the satellite 12 and the expected reception time, the emergency transmitter 22 can then calculate exactly when the next position report 34 has to be sent so that the position report is received at the expected time by the satellite 12 which, in the meantime, is located at a new position of the orbit 32, as illustrated in FIG. 1 by the satellite 12 drawn with a dashed line.

The satellite 12 transfers the received position report 20 with the reception time via the communication connection 38 to the ground station 18 to the latter. The ground station 38 transmits the received data to the management system 26, which stores the position data. Furthermore, the management system monitors the time behavior of the reception of position reports of each logged-in emergency transmitter. For this purpose, the management system 26 monitors the time elapsed since the reception of the last position report for each emergency transmitter. A separate maximum time can be specified after which an automatic alarm is generated for each emergency transmitter logged in to the SAR system. The management system 26 monitors the specified maximum times and, upon exceeding a maximum time, automatically generates the message already mentioned above for the respective emergency transmitter and transmits the message to a rescue coordination center RCC so as to initiate a rescue operation. When the management system 26 receives a position message 20 with the reception time at the satellite 12 from the emergency transmitter 22, monitoring for this emergency transmitter 22 is reset or a timer is restarted. This ensures that despite the reception of the position message 20 from the emergency transmitter 22, no rescue operation is initiated.

Monitoring can principally also take place in the satellite 12, whereby data transfer between satellite 12 and the ground segment 16 can be reduced. The management system 26 could also be accommodated in the satellite 12, for example in the form of a management computer, and the satellite 12 could be configured such that the satellite autonomously monitors all emergency transmitters 22 located and registered in its service area 24 and, in the event that a position report is not received at the expected time, automatically initiates a rescue operation for this emergency transmitter by transmitting a corresponding message to the ground segment 16. Such an implementation can in particular be useful if the satellite 12 is in a GEO and has a relatively large service area 24, for example, the territory of a country or a large nature reserve.

In order to avoid initiating a rescue operation due to an intentionally deactivated emergency transmitter, an emergency transmitter should log out of the SAR system prior to the deactivation. For this purpose, an emergency transmitter sends a deactivation message to a satellite of the space segment. The satellite can forward the deactivation message to the ground segment so that the management system logs the emergency transmitter out of the SAR system. After a successful logout, the ground segment sends a logout confirmation to the satellite which transmits the confirmation to the emergency transmitter, which can deactivate upon receipt of this message. Thus, the emergency transmitter is logged out of the SAR system and removed from monitoring so that no more rescue operations have to be initiated for this transmitter due to missing position messages.

FIG. 2 shows a block diagram of an emergency transmitter 22 comprising a transceiver 42 for communicating with a satellite of the SAR system, a position determining unit 44, for example, a GPS receiver for determining the actual position of the emergency transmitter 22, and a control unit 46, for example in the form of a processor which runs a program (firmware) stored in a memory for processing the position data of the position determining unit 44 and for controlling the transceiver 42.

The firmware configures the processor of the control unit 46 in such a manner that the actual position data, determined by the position determining unit 44, are integrated together with a unique identification, for example a series number or a digital certificate of the emergency transmitter 22, in a position report that is transferred from the control unit 46 to the transceiver 42 which, furthermore, is controlled by the control unit 46 in such a manner that the transceiver transfers the position report on a specific carrier frequency with a specific modulation to a satellite of the SAR system. Here, the carrier frequency and the modulation can be predetermined depending on the SAR system to be used, the region in which the emergency transmitter is currently located, and of course further system-related parameters.

After sending the position report, the firmware configures the processor such that the control unit 46 sets the transceiver 42 for receiving data messages from satellites of the SAR system. As soon as a data message is received by the transceiver 42, the transceiver transmits the data message to the processor of the control unit 46, which extracts the information contained in the received data message. In particular, based on the expected reception time for the next position report contained in the data message and the orbit of the satellite, the processor calculates a suitable time for sending the next position report. Furthermore, the processor evaluates the information for coding the next position report contained in the received data message, in such a manner that the transceiver is put in a corresponding transmit mode. Finally, the processor waits until just before the calculated time of sending, requests from the position determining unit 44 the actual position data, generates a position report as already described above, and transmits the report to the transceiver 42 for sending so that the transceiver 42 sends the position report exactly at the calculated time of sending.

The firmware also configures the processor in such a manner that, for example, upon actuation of a switch of the emergency transmitter, a deactivation message is generated, which is transmitted via the transceiver to the SAR system, and the emergency transmitter is only deactivated if a logout message via the transceiver is received by the SAR system.

The emergency transmitter can be configured as a battery-operated device for mobile operation and for the use, for example, in rough terrain, or also as a stationary device which can be permanently installed, for example, in particular in small airplanes. The emergency transmitter can also be configured in the form of an electronic module or even an integrated circuit which, for example, can be integrated in a larger electronic device.

With the present invention, satellite-based SAR services can be improved in that a smaller search area is obtained in an emergency. Furthermore, alerting is also possible in the event of a defective or destroyed emergency transmitter and a rescue operation can be initiated, whereby safety of the SAR services can be significantly improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST

10 Space segment
12 First satellite of the space segment
14 Second satellite of the space segment
16 Ground segment
18 Ground station
20 Position report
22 Emergency transmitter
24 Service area of the first satellite 12
26 Service area of the second satellite 14
28 Management system for the emergency transmitter
30 Data message of the satellite 12
32 Orbit of the satellite 12
34 Next position report
36 Second emergency transmitter
38 Communication connection between the first satellite 12 and the ground station 18
40 Communication connection between the second satellite 14 and the ground station 18
42 Transceiver
44 Position determining unit
46 Control unit
48 Receiver for navigation signals of a satellite navigation system
50 Processor

The invention claimed is:

1. A satellite-based search and rescue (SAR) system comprising:
a space segment with a plurality of satellites; and
a ground segment with one or a plurality of ground stations,
wherein a satellite of the plurality of satellites is configured to receive a position report from an emergency transmitter in its service area and to forward it to a ground station,
wherein the ground segment is configured to store the position of the emergency transmitter received with the last position report in a management system for emergency transmitters,
wherein the emergency transmitter is configured to send position reports to the satellite such that the reception of position reports at the satellite is coordinated such that at any time only position reports arrive that differ with regard to their signal parameters such that simultaneous reception is possible,
wherein a rescue operation is initiated for the emergency transmitter if no deactivation message has been received from the emergency transmitter and no position report is received from the emergency transmitter within a specified period,
wherein a data message with an expected time at which a next position report from the emergency transmitter is to be received at a satellite is transmitted to the emergency transmitter, or a data message with at least one parameter for an algorithm, according to which the individual emergency transmitters can calculate the planned reception times of their messages at the satellite and the signal parameters used for this purpose, is transmitted simultaneously to a multiplicity of emergency transmitters in the service area, and
wherein the emergency transmitter is configured to determine the position of the satellite based on the information contained in the received data message and, with the position of the satellite and its own position, is configured to calculate when the next position report is to be sent to the satellite such that said position report is received by the satellite at the expected time.

2. The system according to claim 1, wherein for deactivating, an emergency transmitter is configured to send a deactivation message to the space segment, and after receiving the deactivation message, the logout of the emergency transmitter is initiated, and after logging out, a logout message is transmitted via the space segment to the emergency transmitter which deactivates after receiving this message.

3. The system according to claim 1, wherein a specified coding is included in a data message with which the next position report from the emergency transmitter is to be received, wherein the specified coding comprises in particular a specified frequency, a specified modulation, or a specified message content.

4. The system according to claim 1, wherein the expected time included in the data message is determined such that at the expected time, a satellite sending the data message is still within the reception range of the emergency transmitter.

5. The system according to claim 1, wherein a time difference between a time of sending a data message and the expected time included in the data message is less than 5 minutes.

6. The system according to claim 1, wherein initiating a rescue operation for an emergency transmitter comprises transmitting a rescue message from the management system to a rescue coordination center in the vicinity of the emergency transmitter's position last stored in the management system.

7. An emergency transmitter for a satellite-based search and rescue (SAR) system, comprising
a transceiver configured to send and receive messages to or from satellites of a space segment of the SAR system;
a position determining unit configured to determine an actual position of the emergency transmitter; and
a control unit configured to generate and send position messages via the transceiver and receiving and configured to process data messages at and from, respectively, satellites of the space segment of the SAR system,
wherein the control unit is configured such that it determines, based on the information contained in a received data message, the position of the satellite which has sent the data message, and calculates with the position of the satellite and the actual position of the emergency transmitter when the next position report is to be sent to the satellite, and sends at the calculated time the next position report with the now actual position of the emergency transmitter via the transceiver to the satellite.

8. The emergency transmitter according to claim 7, wherein the position determining unit comprises a receiver for navigation signals of a satellite navigation system, and a processor is configured to calculate the actual position from received navigation signals.

9. The emergency transmitter according to claim 7, wherein the control unit is configured such that based on the specified coding contained in the received data and with which the next position report from the emergency transmitter is to be received, said control unit controls how the next position report is sent to a satellite, wherein the specified coding comprises in particular a specified frequency, a specified modulation, or a specified message content, and the control unit controls, according to the specification, the frequency, the modulation, or the message content of the next position report to be sent.

10. A method for satellite-based search and rescue (SAR) system comprising a space segment with a plurality of satellites and a ground segment with one or a plurality of ground stations, the method comprising:
receiving, by a satellite of the plurality of satellites, a position report from an emergency transmitter in its service area and forwarding the receive position report to a ground station;
storing, by the ground segment in a management system for emergency transmitters, the position of the emergency transmitter received with the last position report;
sending, by the emergency transmitter, position reports to the satellite such that the reception of position reports at the satellite is coordinated such that at any time only position reports arrive that differ with regard to their signal parameters such that simultaneous reception is possible; and
initiating a rescue operation is initiated for the emergency transmitter if no deactivation message has been received from the emergency transmitter and no position report is received from the emergency transmitter within a specified period,
wherein a data message with an expected time at which a next position report from the emergency transmitter is to be received at a satellite is transmitted to the emergency transmitter, or a data message with at least one parameter for an algorithm, according to which the individual emergency transmitters can calculate the planned reception times of their messages at the satellite and the signal parameters used for this purpose, is transmitted simultaneously to a multiplicity of emergency transmitters in the service area, and
wherein the emergency transmitter determines the position of the satellite based on the information contained in the received data message and, with the position of the satellite and its own position, calculates when the next position report is to be sent to the satellite such that said position report is received by the satellite at the expected time.

11. The method according to claim 10, wherein for deactivating, an emergency transmitter sends a deactivation message to the space segment, and after receiving the deactivation message, the logout of the emergency transmitter is initiated, and after logging out, a logout message is transmitted via the space segment to the emergency transmitter which deactivates after receiving this message.

12. The method according to claim 10, wherein a specified coding is included in a data message with which the next position report from the emergency transmitter is to be received, wherein the specified coding comprises in particular a specified frequency, a specified modulation, or a specified message content.

13. The method according to claim 10, wherein the expected time included in the data message is determined such that at the expected time, a satellite sending the data message is still within the reception range of the emergency transmitter.

14. The method according to claim 10, wherein a time difference between a time of sending a data message and the expected time included in the data message is less than 5 minutes.

15. The method according to claim 10, wherein initiating a rescue operation for an emergency transmitter comprises transmitting a rescue message from the management system to a rescue coordination center in the vicinity of the emergency transmitter's position last stored in the management system.

* * * * *